(12) United States Patent
Dobosz et al.

(10) Patent No.: US 7,855,852 B2
(45) Date of Patent: Dec. 21, 2010

(54) CLAMPING SYSTEM FOR A DATA STORAGE DEVICE

(75) Inventors: Stanislaw Dobosz, Shrewsbury, MA (US); Bruce Gifford, Nashwa, NH (US)

(73) Assignee: Seagate Technology LLC, Scotts Valley, CA (US)

( * ) Notice: Subject to any disclaimer, the term of this patent is extended or adjusted under 35 U.S.C. 154(b) by 972 days.

(21) Appl. No.: 11/710,203

(22) Filed: Feb. 23, 2007

(65) Prior Publication Data

US 2008/0204928 A1 Aug. 28, 2008

(51) Int. Cl.
*G11B 17/08* (2006.01)
(52) U.S. Cl. .................................... 360/99.12
(58) Field of Classification Search .............. 360/99.06, 360/99.12, 99.08
See application file for complete search history.

(56) References Cited

U.S. PATENT DOCUMENTS

| 5,367,418 | A | * | 11/1994 | Chessman et al. | 360/99.12 |
| 5,452,157 | A | * | 9/1995 | Chow et al. | 360/98.08 |
| 5,457,589 | A | * | 10/1995 | Leuthold et al. | 360/99.12 |
| 5,943,184 | A | | 8/1999 | Kelsic et al. | 360/98.08 |
| 6,417,988 | B1 | * | 7/2002 | Renken et al. | 360/99.12 |
| 6,567,238 | B1 | * | 5/2003 | Renken et al. | 360/99.12 |
| 6,775,094 | B2 | | 8/2004 | Tokizaki | 360/98.08 |
| 6,778,353 | B1 | * | 8/2004 | Harper | 360/99.08 |
| 6,788,494 | B2 | | 9/2004 | Khanna et al. | 360/98.08 |
| 2001/0036038 | A1 | | 11/2001 | Kazmierczak | 360/98.08 |
| 2002/0071206 | A1 | | 6/2002 | Choo et al. | 360/99.12 |
| 2002/0109939 | A1 | | 8/2002 | Schwandt et al. | 360/99.12 |
| 2003/0169533 | A1 | | 9/2003 | Aiello | 360/98.08 |
| 2003/0174440 | A1 | | 9/2003 | Kloeppel et al. | 360/99.12 |
| 2003/0193738 | A1 | | 10/2003 | Renken | 360/98.07 |
| 2004/0032691 | A1 | | 2/2004 | Drake et al. | 360/99.12 |
| 2004/0213138 | A1 | | 10/2004 | Kim | 369/212 |
| 2006/0232881 | A1 | * | 10/2006 | Hayakawa et al. | 360/99.12 |

\* cited by examiner

*Primary Examiner*—Allen T Cao
(74) *Attorney, Agent, or Firm*—Westman, Champin & Kelly (57) ABSTRACT

A clamping system includes a stack of storage media discs that includes an annular outer disc surface. A clamp includes a clamp surface that faces the outer disc surface. A ring is disposed between the clamp surface and the outer disc surface. The ring has a crested ring face with a circular crest line that contacts the clamp surface.

20 Claims, 11 Drawing Sheets

CLAMPING SYSTEM FOR A DATA STORAGE DEVICE

BACKGROUND

In disc drives, a read/write head flies over a disc surface at a fly height. As the areal density of disc drives increases with newer designs, there is an increasing need to provide lower fly heights in order to read data with the increased areal density. With the lower fly heights, there is an increased danger of the read/write head crashing into the disc if there are deviations from flatness of the disc surface.

In disc drives that include a stack of multiple discs, it is found that there are particular problems with flatness of the discs at the ends of the stack (outer discs) that are in direct contact with clamps. The clamping forces distort the outer discs. In the past, these problems with the outer discs were less severe because fly heights were greater. With the increasing areal density in new designs, however, fly heights are smaller and the outer disks must meet more stringent flatness requirements.

A method and apparatus are needed to reduce warping of outer discs in a disc stack, and to provide improved flatness of the outer discs surfaces. Embodiments of the present invention provide solutions to these and other problems, and offer other advantages over the prior art.

SUMMARY

Disclosed is a clamping system. The clamping system includes a stack of storage media discs that includes an annular outer disc surface. The clamping system includes a clamp. The clamp has a clamp surface that faces the outer disc surface. The clamping system includes a ring. The ring is disposed between the clamp surface and the outer disc surface. The ring has a crested ring face with a circular crest line that contacts the clamp surface.

Other features and benefits that characterize embodiments of the present invention will be apparent upon reading the following detailed description and review of the associated drawings.

DETAILED DESCRIPTION

In the embodiments described below in connection with FIGS. 1, 3-7, a clamping system is disclosed that can be used for clamping a stack of discs in a disc drive. A ring is disposed between a clamp and an outer disc of the disc stack. The ring has a crested surface that makes a rocking contact with the clamp along a circular crest line. The rocking contact reduces transmission of twisting forces between the clamp and the ring. The ring has a flat surface that makes contact with a flat surface of the disc. During tightening of the clamp, the flat surfaces can slide relative to one another, reducing transmission of translational forces through the clamping system. When tightening is complete, the outer disc surface has a reduced level of stress. The outer disc remains flat and coning is reduced. Higher areal densities can be used when the clamping system is used to keep outer discs flatter.

Figure 1:
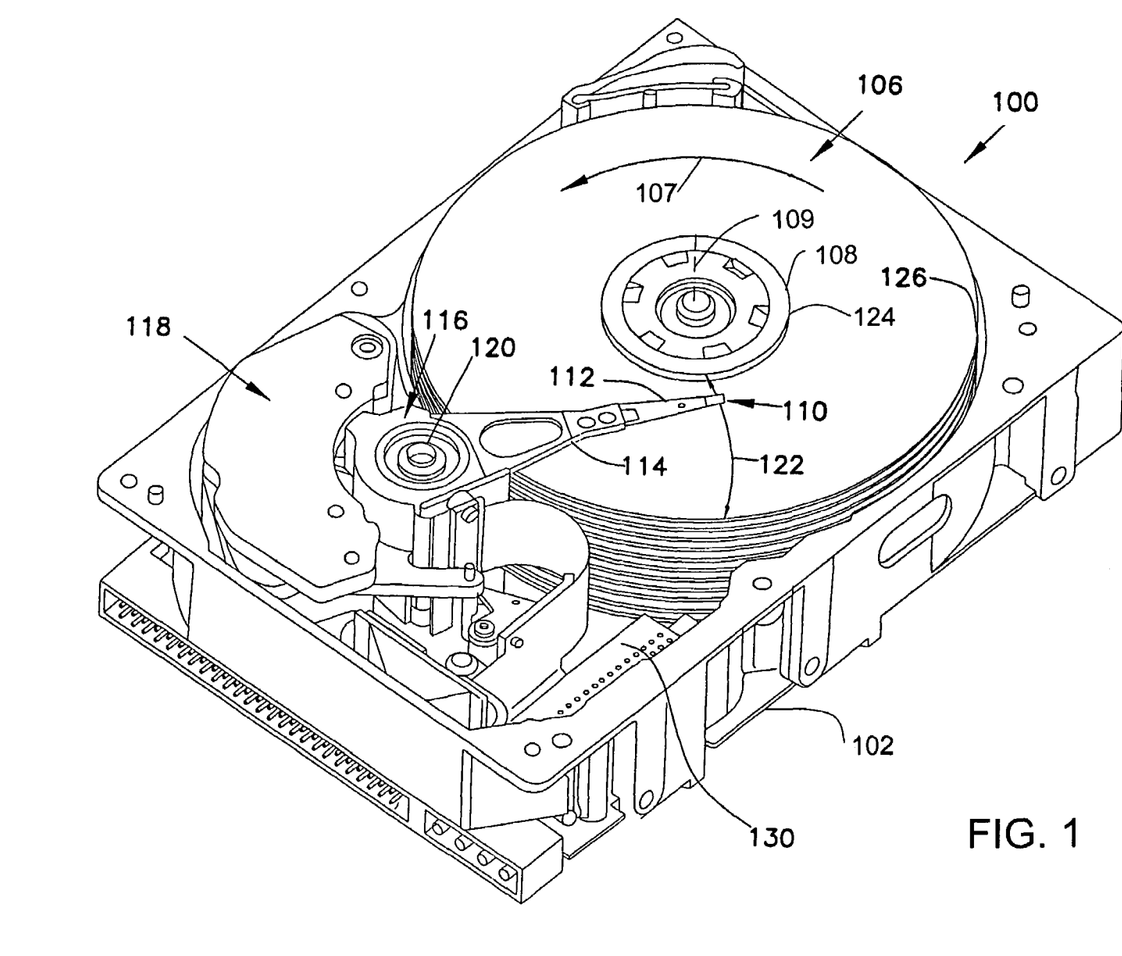
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). The disc drive 100 illustrated in FIG. 1 is merely exemplary, and other types of data storage devices can be used as well.

Figure 2:
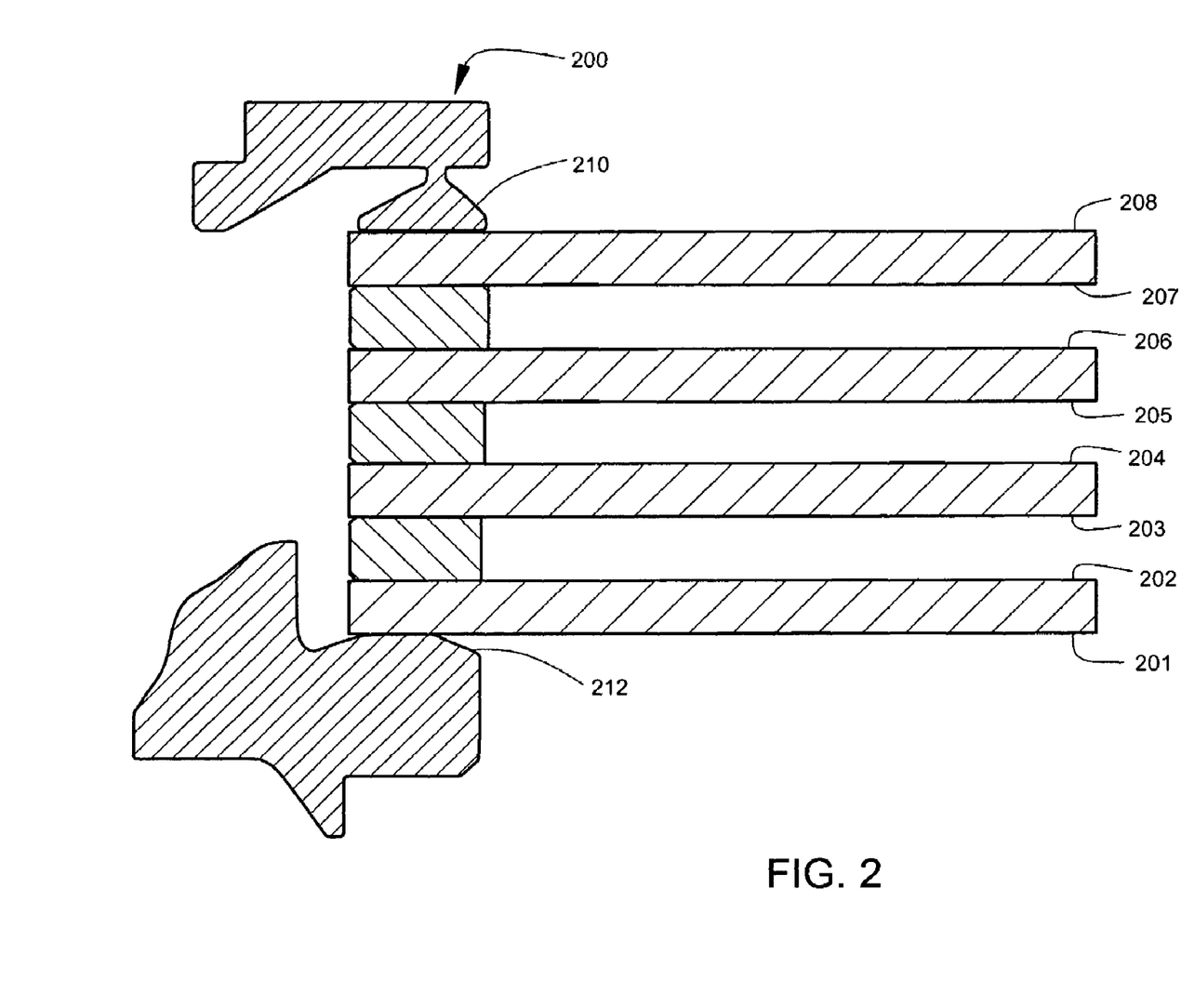
FIG. 2 illustrates an arrangement for clamping discs.
Figure 8:
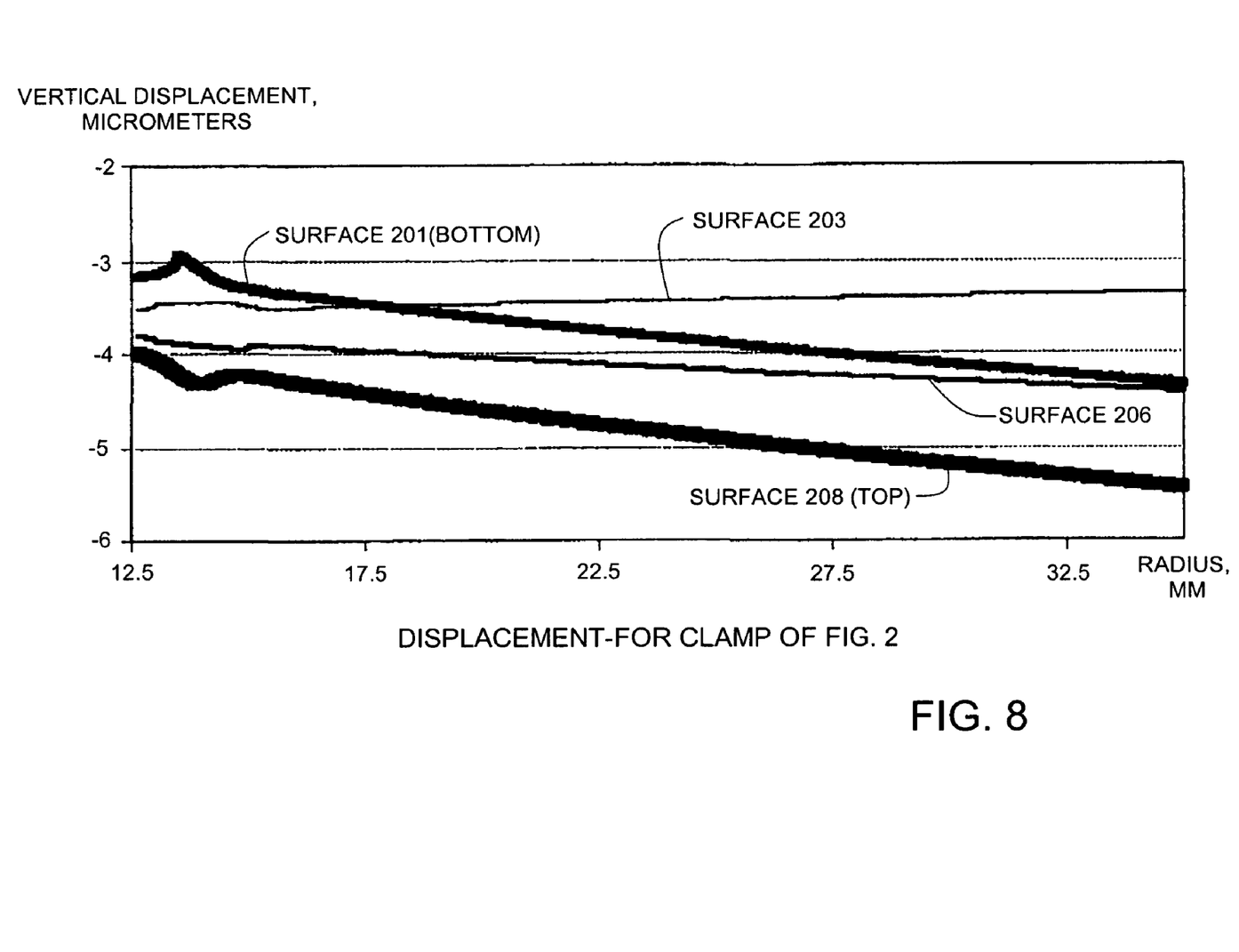
FIG. 8 illustrates disc surface displacements due to clamping for the disc clamping arrangement illustrated in FIG. 2.
Figure 10:
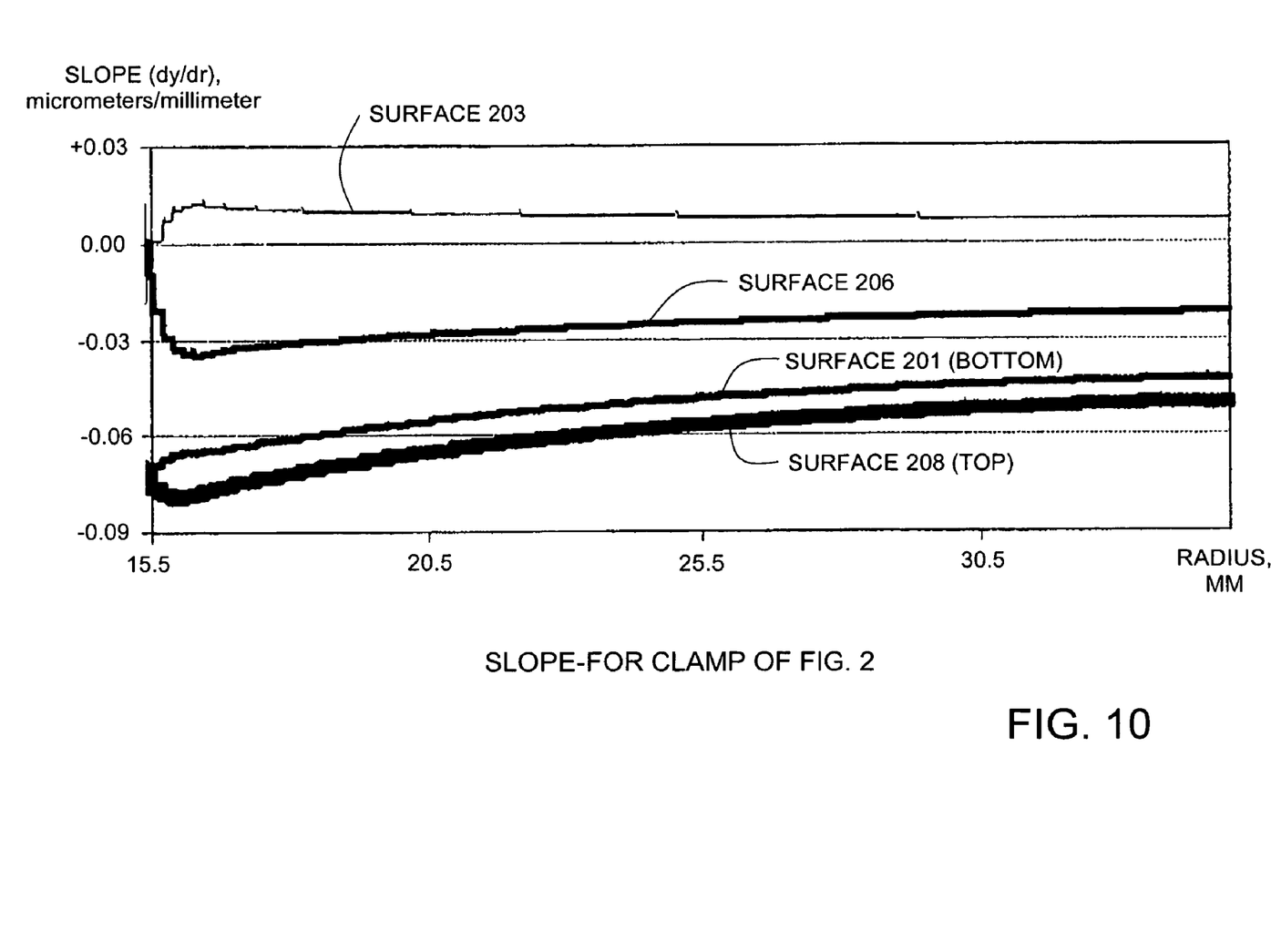
FIG. 10 illustrates disc surface radial slopes due to clamping for the disc clamp illustrated in FIG. 2.

FIG. 2 illustrates an arrangement 200 for clamping discs. The clamping arrangement 200 includes clamping parts 210, 212 and a stack of discs with disc surfaces 201, 202, 203, 204, 205, 206, 207, 208 that are clamped, directly or indirectly, by the clamping parts 210, 212. The clamping parts 210, 212 distort as clamping force is increasingly applied. As the distortion occurs, the contact between clamping part 210 and disc surface 208 is subjected to increasing contact forces that distort the disc surfaces 201, 208. This distortion of the disc surfaces is referred to as "coning". Measurements of distortion of disc surfaces 201 and 208 are illustrated in FIGS. 8 and 10. Distortions of the disc surfaces 201, 208 increase misalignment between the disc surfaces 201, 208 and heads that fly over the disc surfaces. This misalignment limits the useful areal density of data that can be stored on the disc surfaces.

Figure 3:
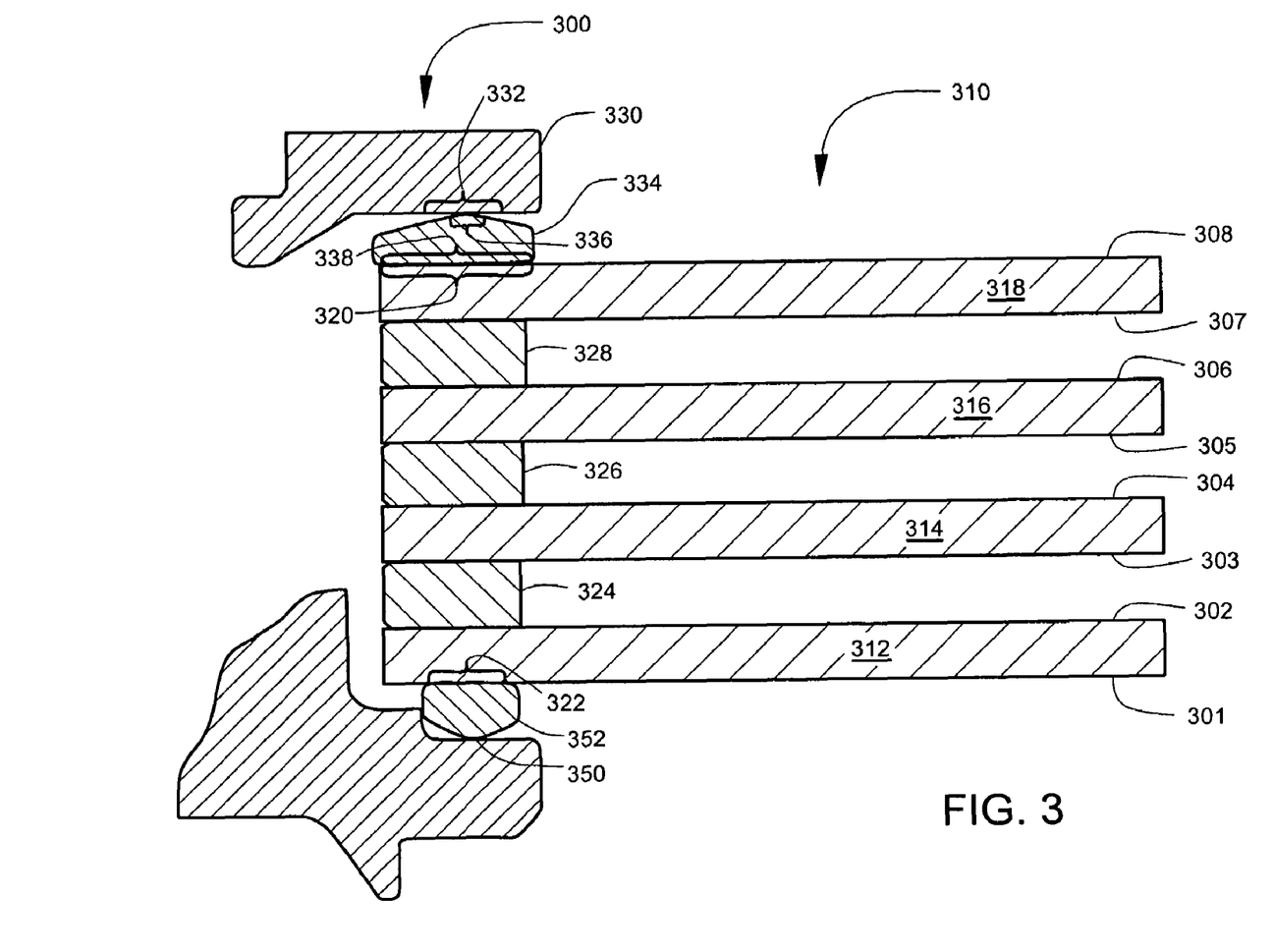
FIG. 3 illustrates a clamping system that includes a ring.

FIG. 3 illustrates a clamping system 300 for a stack 310 of storage media discs. The stack 310 comprises outer storage media discs 312, 318 and inner storage media discs 314, 316. The stack of storage media discs includes storage media surfaces 301, 302, 303, 304, 305, 306, 307 and 308 that are accessed by read/write heads (not illustrated in FIG. 3) that fly over storage media surfaces on air bearings.

The storage media discs 312, 314, 316, 318 are spaced apart from one another by annular spacer rings 324, 326, 328. As described in more detail below in connection with FIGS. 9 and 11, the clamping system 300 clamps the storage media discs 312, 314, 316, 318 while avoiding excessive distortion of storage media surfaces 301, 302, 307, 308 on outer storage media discs 312, 318.

The clamping system 300 comprises annular outer disc surfaces 320 and 322 of the stack 310. The clamping system comprises a clamp 330 that includes an annular clamp surface 332 that faces the outer disc surface 320. The clamping system 300 comprises a ring 334. The ring 334 is disposed between the clamp surface 332 and the outer disc surface 320. The ring 334 has a crested ring face 336 that contacts the clamp surface 332 along a circular crest line 340 (shown in FIGS. 4-5).

Rings can be provided at both the top and bottom of the disc stack 310. A second outer disc surface 322, a second clamp surface 350, and a second ring 352 can be provided as illustrated. The second clamp surface 350 is on a hub flange as illustrated.

Figure 4:
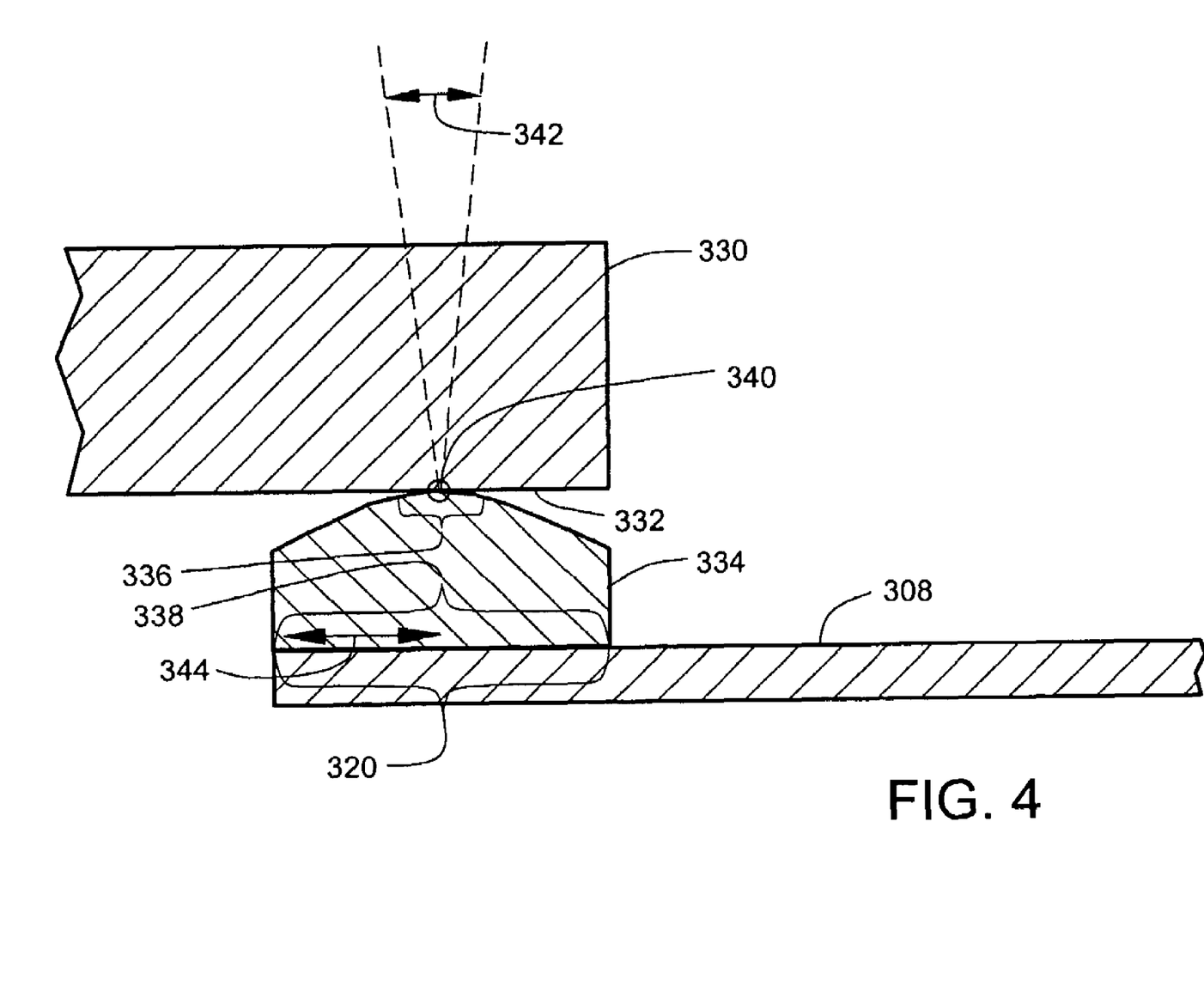
FIG. 4 illustrates an enlarged view of the clamping system of FIG. 3.

FIG. 4 illustrates an enlarged view of the clamping system 300 in FIG. 3. Reference numbers used in FIG. 4 that are the same as reference numbers used in FIG. 3 identify the same features. As illustrated in FIG. 4, there is a rocking contact along circular crest line 340.

As the clamp system 330 is increasingly tightened or clamped, the clamp 330 may twist slightly and change its angle slightly with respect to the ring 334 as illustrated at 342. The rocking contact along circular crest line 340 prevents transmission of torque to the ring 334. The ring 334 does not twist, and the distortion transmitted to the disc surface 308 is greatly reduced. The crested surface of the ring 334 rocks on the flat surface of the clamp 330.

As the clamp system 330 is increasingly tightened or clamped, the ring 334 may slide radially and change its radial position slightly with respect to the surface 320 as illustrated at 344. The flat surfaces and large surface areas of surfaces 338, 320 permit easy sliding when less than full clamping force is applied. The sliding contact between surfaces 338, 320 reduces transmission of translational forces through the ring 334. The ring 334 is not translationally stressed, and the distortion transmitted to the disc surface 308 is greatly reduced. When the clamp system is fully tightened, however, enough clamping force is exerted to prevent further sliding and secure the disc stack 310.

The major forces exerted on the ring 334 due to clamping are compressive forces. The rocking contact along crest line 340 and the sliding contact between surfaces 320 and 338 prevent twisting forces on the ring that could cause disc distortion.

The use of ring 334 reduces distortion of the outer disc surface 320. The ring 334 isolates the outer disc surface 320 from irregularities of the clamping components. In one embodiment, the clamp surface 332 comprises a flat surface, and the crested ring face 336 can slide across the flat surface while the clamping force is being increased. The ring 334 has a flat ring face 338 that contacts the flat outer disc surface 320 along a flat annular contact surface. The flat ring face 338 diffuses a clamping force over the annular disc surface 320, avoiding stress concentrations in the disc. The contact at the circular contact line 340 comprises a rocking contact that resists coupling of torsional force between the clamp 330 and the ring 334.

Figure 5:
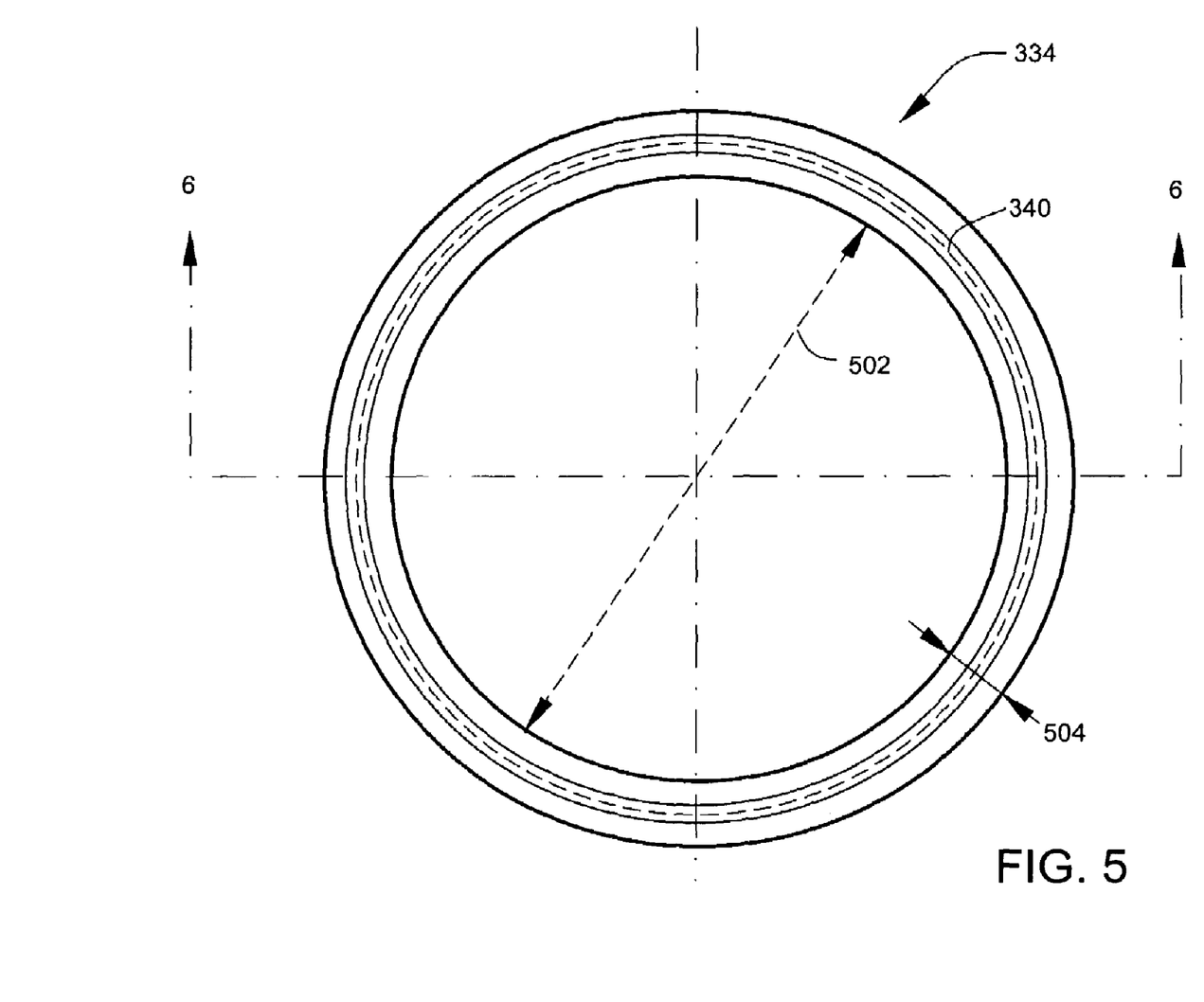
FIG. 5 illustrates a top view of the ring.

FIG. 5 illustrates a top view of the ring 334 and the circular crest line 340. The ring 334 has an inner diameter 502 and a radial width 504. Cross-sectional views along line 6-6 in FIG. 5 are illustrated in FIGS. 6A, 6B.

Figure 6A:
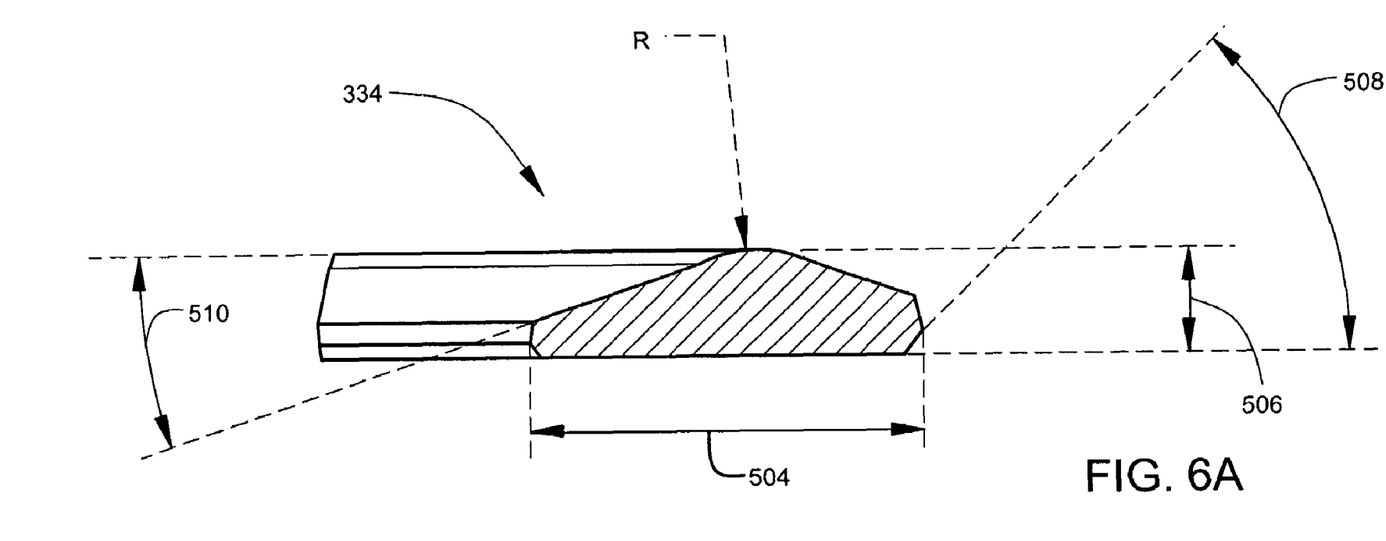
FIGS. 6A-6B illustrate cross-sectional views of the ring.
Figure 6B:
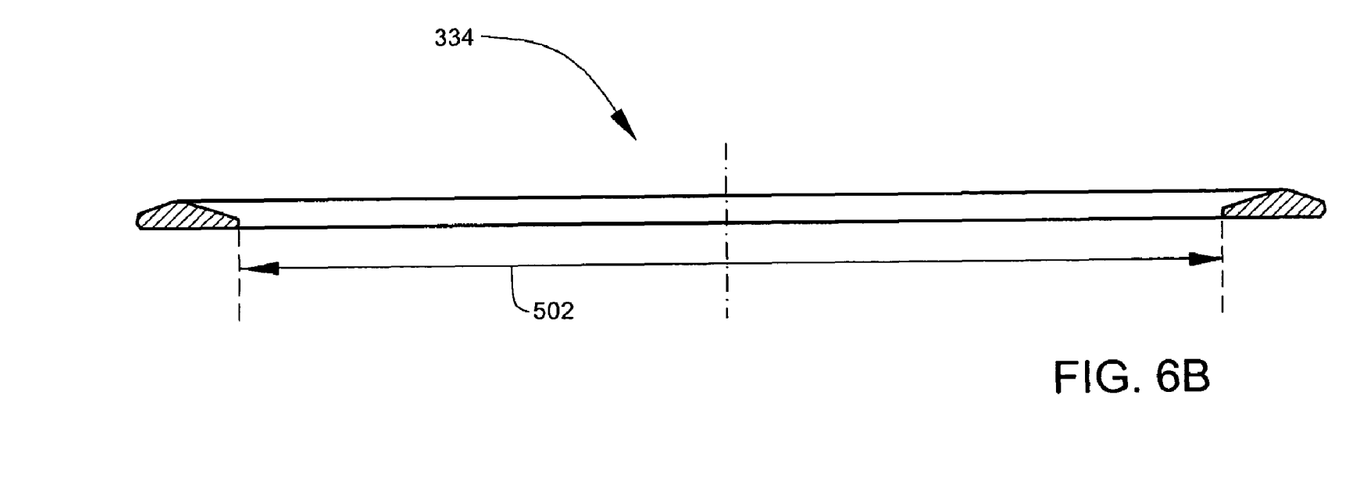

FIG. 6A illustrates an enlarged cross-sectional view of the ring 334. The ring has a rounded or crested top surface with a radius R. The rounded top surface blends to beveled surfaces with a bevel angle 510. The bottom surface of the ring 334 has a generally flat surface with chamfered edges with a chamfer angle 508. The ring 334 has a ring thickness 506. In one embodiment, the ring 334 comprises a flexible ring that has a ring thickness 506 and a radial width 504, and the thickness is more than 20% of the radial height. The selected range of a ratio of thickness-to-width of over 20% ensures that force from the circular crest line 340 is sufficiently diffused over a wider area before it reaches the outer disc surface. FIG. 6B illustrates a cross-sectional view of the ring 334 with an inner diameter 502.

The ring 334 can comprise any suitable material that is compatible with the material of the disc. Metals (such as aluminum alloy or steel, for examples) or ceramic material can be used. For use with some discs, plating of the ring (such as electroless nickel plating or other plating) is desirable.

Figure 7:
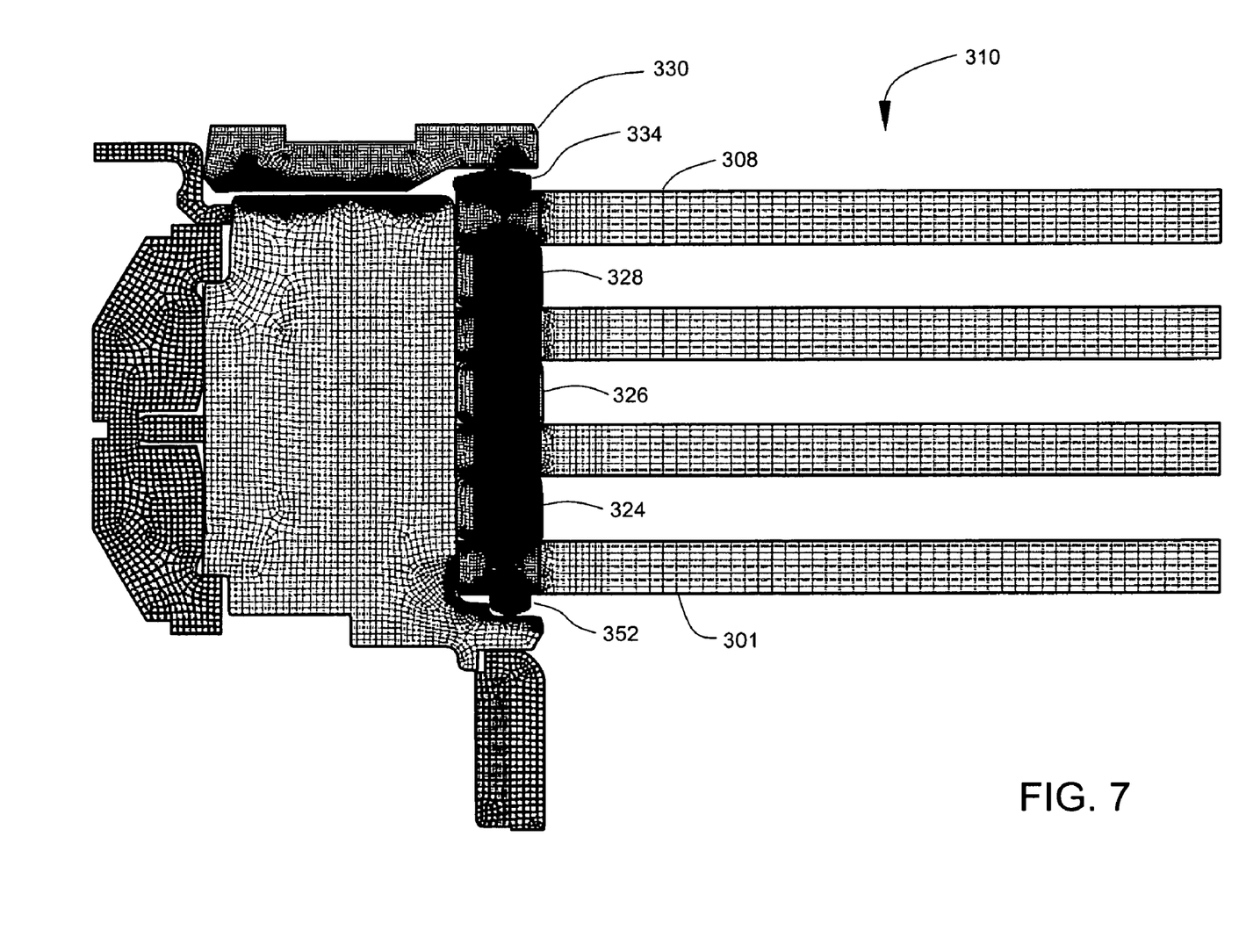
FIG. 7 illustrates a finite element model (FEM) of a clamping system.
Figure 9:
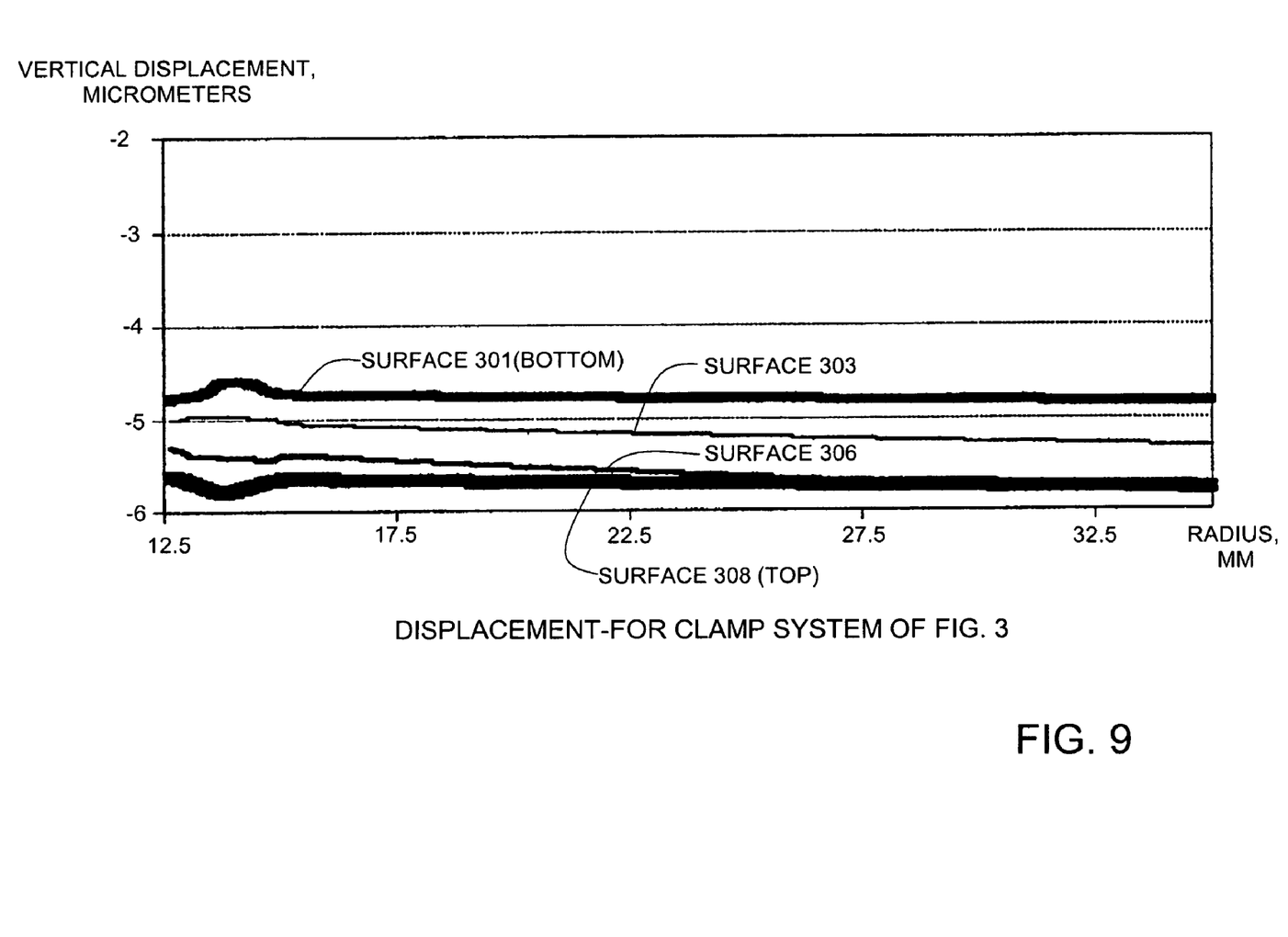
FIG. 9 illustrates disc surface displacements due to clamping for the disc clamp system illustrated in FIGS. 3-4.

FIG. 7 illustrates a finite element model (FEM) of the clamp system shown in FIGS. 3-4. FIG. 8 illustrates disc surface displacements due to clamping for the disc clamp illustrated in FIG. 2. As can be seen in FIG. 8, displacements due to clamping are large for the outer disc surface 201 (bottom) and the outer disc surface 208 (top). The outer disc surface displacements (coning) due to clamping in FIG. 8 are about 1.4 micrometers. FIG. 9 illustrates disc surface displacements due to clamping for the disc clamp system 300 illustrated in FIGS. 3-4. As can be seen in FIG. 9, displacements due to clamping are smaller for the outer disc surface 301 (bottom) and the outer disc surface 308 (top). The outer disc surface displacements (coning) due to clamping in FIG. 9 are about 0.2 micrometers. The smaller disc displacements shown in FIG. 9 reduce the range of motion needed for the heads that fly over the disc surfaces.

Figure 11:
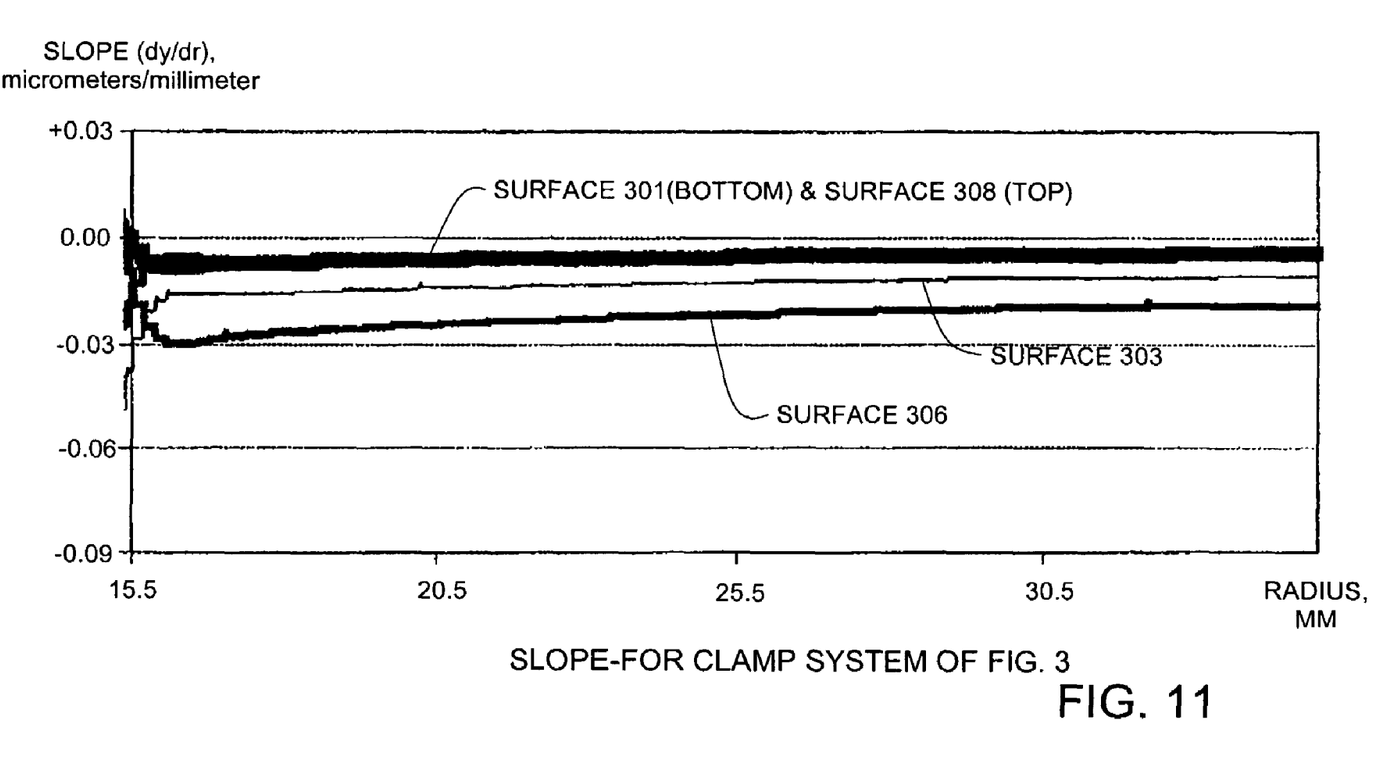
FIG. 11 illustrates disc surface radial slopes due to clamping for the disc clamp system illustrated in FIGS. 3-4.

FIG. 10 illustrates disc surface slopes due to clamping for the disc clamp illustrated in FIG. 2. As can be seen in FIG. 10, slopes due to clamping are large for the outer disc surface 201 (bottom) and the outer disc surface 208 (top). The outer disc surface slopes due to clamping in FIG. 10 are about 0.07 micrometers/millimeter. FIG. 11 illustrates disc surface slopes due to clamping for the disc clamp system 300 illustrated in FIGS. 3-4. As can be seen in FIG. 11, slopes due to clamping are smaller for the outer disc surface 301 (bottom) and the outer disc surface 308 (top). The outer disc surface slopes due to clamping in FIG. 11 are about 0.01 micrometers/millimeter. The smaller disc slopes shown in FIG. 11 reduce the range of roll needed for the heads that fly over the disc surfaces.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the clamping system while maintaining substantially the same functionality without departing from the scope and spirit of the present invention.

What is claimed is:

1. A clamping system for clamping a disc, the clamping system comprising:
   a clamp that includes a clamp surface that faces an outer disc surface; and
   a ring, disposed between the clamp surface and the outer disc surface, and the ring having a crested surface configured to rock on the clamp surface.

2. The clamping system of claim 1 wherein the ring reduces distortion of the outer disc surface.

3. The clamping system of claim 1 wherein the clamp surface comprises a flat surface, and the crested surface is slidable across the flat surface as a clamping force is increased.

4. The clamping system of claim 1 wherein the flat surface is bounded by chamfered edges.

5. The clamping system of claim 1 wherein the ring has a flat ring face that contacts the outer disc surface along an annular contact surface.

6. The clamping system of claim 5 wherein the flat ring face diffuses a clamping force at the outer disc surface.

7. The clamping system of claim 5 wherein the crested surface resists coupling of torsional force between the clamp and the ring.

8. The clamping system of claim 1 wherein the ring has a thickness and a radial width, and the thickness is more than 20% of the radial width.

9. The clamping system of claim 1 and further comprising a second outer disc surface, a second clamp surface, and a second ring disposed between the second clamp surface and the second outer disc surface, and the second ring has a crested surface that contacts the second clamp surface.

10. The clamping system of claim 1, further comprising a plurality of magnetic storage discs.

11. The clamping system of claim 1 and further comprising heads flying over the discs.

12. The clamping system of claim 11 wherein an actuator moves the heads across the discs.

13. A method of clamping, comprising:
providing a stack of storage media discs that includes an annular outer disc surface;
providing a clamp that includes a clamp surface; and
disposing a ring between the outer disc surface and the clamp surface, the ring being slidable across the clamping surface as a clamping force is increased.

14. The method of claim 13 and comprising:
providing a second outer disc surface, a second clamp surface on a hub flange, and a second ring;
disposing the second ring between the second clamp surface and the second outer disc surface; and
providing a rocking contact between the second ring and the second clamp surface.

15. The method of claim 13 and comprising:
forming the clamp surface with a flat annular shape that permits the rocking contact to move across the flat annular shape as a clamping force is increased.

16. A clamping system, comprising:
a stack of storage media discs that includes an annular outer disc surface;
a clamp that includes a clamp surface that faces the outer disc surface; and
a ring, disposed between the clamp surface and the outer disc surface, and the ring has a rocking contact with the clamp.

17. The clamping system of claim 16 and further comprising a second outer disc surface, a second clamp surface, and a second ring disposed between the second clamp surface and the second outer disc surface, and the second ring has a rocking contact with the second clamp surface.

18. The clamping system of claim 16 wherein the clamp surface comprises a flat surface, and the rocking contact is slidable across the flat surface as a clamping force is increased.

19. The clamping system of claim 16 wherein the boundaries of the flat surface comprise chamfered edges.

20. The clamping system of claim 16 wherein the storage media discs comprise magnetic media discs.

\* \* \* \* \*